United States Patent [19]

Garland et al.

[11] Patent Number: 4,797,235

[45] Date of Patent: Jan. 10, 1989

[54] PROCESS FOR ENHANCED ORIENTATION OF POLYMERIC FILMS

[75] Inventors: Steven B. Garland, Simpsonville; Thomas C. Warren, Greer, both of S.C.

[73] Assignee: W. R. Grace & Co., Duncan, S.C.

[21] Appl. No.: 39,551

[22] Filed: Apr. 16, 1987

[51] Int. Cl.⁴ ............................................. B29C 35/10
[52] U.S. Cl. .................................... 264/22; 264/173; 264/209.6; 264/230
[58] Field of Search ................ 264/22, 24, 108, 209.6, 264/230, 231, 171, 173

[56] References Cited

U.S. PATENT DOCUMENTS

| | | | |
|---|---|---|---|
| 3,022,543 | 2/1962 | Baird et al. | 428/36 |
| 3,448,182 | 6/1969 | Derbyshire et al. | 264/230 |
| 3,456,044 | 7/1969 | Pahlke | 264/25 |
| 3,555,604 | 1/1971 | Pahlke | 425/72.1 |
| 3,741,253 | 6/1973 | Brax | 428/36 |
| 3,821,182 | 6/1974 | Baird, Jr. et al. | 428/220 |
| 4,048,428 | 9/1977 | Baird, Jr. et al. | 526/343 |
| 4,178,401 | 12/1979 | Weinberg | 428/35 |
| 4,188,443 | 2/1980 | Mueller et al | 428/216 |
| 4,194,039 | 3/1980 | Mueller | 428/213 |
| 4,229,241 | 10/1980 | Mueller | 156/243 |
| 4,274,900 | 6/1981 | Mueller et al. | 156/229 |
| 4,465,812 | 9/1982 | Moriguchi et al. | |
| 4,515,745 | 5/1985 | Churma et al. | 264/211 |
| 4,525,257 | 6/1985 | Kurtz et al. | 522/158 |
| 4,614,764 | 9/1986 | Colombo et al. | 525/72 |
| 4,675,364 | 6/1987 | Churma et al. | 525/387 |

FOREIGN PATENT DOCUMENTS

| | | | |
|---|---|---|---|
| 2836798 | 3/1980 | Fed. Rep. of Germany | 264/22 |
| 53-56241 | 5/1978 | Japan | 264/22 |
| 58-18228 | 2/1983 | Japan | 264/25 |
| 59-100141 | 6/1984 | Japan | 264/22 |
| 59-184629 | 10/1984 | Japan | 264/22 |
| 3461 | 12/1981 | PCT Int'l Appl. | 264/22 |

OTHER PUBLICATIONS

Encyclopedia of Polymer Science and Technology, Plastics, Resins, Rubbers, Fibers, published by John Wiley & Sons, Inc. and Copyrighted in 1966, pp. 331 to 414 of vol. 4.

*Primary Examiner*—Jeffery Thurlow
*Assistant Examiner*—Jill L. Heitbrink
*Attorney, Agent, or Firm*—John J. Toney; William D. Lee, Jr.; Jennifer L. Skord

[57] ABSTRACT

Described is the presence of both a chemical cross linking agent and irradiation such as electron beam irradiation, in the manufacturing process for making an oriented, i.e. heat-shrinkable, polymeric film. The presence of both results in an amount of cross-linking that is effective to accomplish an increased orientation rate during manufacturing.

8 Claims, No Drawings

PROCESS FOR ENHANCED ORIENTATION OF POLYMERIC FILMS

FIELD OF THE INVENTION

The present invention relates to the use of both a chemical cross-linking agent and irradiation in the manufacturing process for making an oriented, i.e. heat-shrinkable, polymeric film. Generally in the manufacture of heat shrinkable films, polymer layer(s) are melt extruded as a "blown bubble" through an annular die to form a tube which is cooled and collapsed, and then stretched (oriented) typically by inflating the extruded tube of film with a gas to form a "bubble" in the tube. Typically, irradiation is employed prior to orientation. By the practice of this invention, the orientation speed is improved.

BACKGROUND OF THE INVENTION

That cross-linking of polymers may be accomplished chemically through utilization of chemical cross-linking agents is well known to those of skill in the art. For instance, cross-linking agents, such as organic peroxides, have been used to cross-link polyethylene polymers and copolymers. A general discussion of chemical cross-linking can be found at pages 331 to 414 of volume 4 of the Encyclopedia of Polymer Science and Technology, Plastics, Resins, Rubbers, Fibers published by John Wiley & Sons, Inc. and copyrighted in 1966. This document has a United States Library of Congress Catalog Card Number of 64-22188 and the referenced pages are hereby incorporated by reference. Typically, the chemical cross-linking agents react with the polymer to form a solid or highly viscous cross-linked copolymer. Furthermore, it is also known from U.S. Pat. No. 4,515,745 (1985) to Churms that when an organic peroxide chemical cross-linking agent is used in ethylene vinyl acetate (EVA) copolymer, in an amount small enough not to form gel measurable by ASTM test mehod number D 2765 (ASTM D2765 is further discussed below), i.e. the EVA containing a cross-linking agent is soluble in a solvent such as xylene, then the rheology during extrusion is modified, i.e. the bubble is more stable as the EVA is more easily stretchable. Similarly, U.S. Pat. No. 4,614,764 (1986) to Colombo et al shows greater bubble stability in the blown tubular film extrusion process by using organic peroxides, optionally in combination with an unsaturated silane, in linear low density polyethylene (LLDPE).

It is also generally well known in the art that irradiation, such as by electron beam irradiation, of certain polymeric film materials results in the irradiative cross-linking of the polymeric molecular chains contained therein and that such action generally results in a material having improved heat shrink properties, abuse resistance, structural integrity, tensile strength, puncture resistance, and/or delamination resistance. Such physical improvements from irradiation, in particular the improved heat shrink properties, are discussed in U.S. Pat. No. 3,022,543 (1962) to Baird et. al. Many of the other physical improvements also are discussed at columns 2 and 8 of U.S. Pat. No. 4,178,401 (1979) to Weinberg and at column 4 of U.S. Pat. No. 3,741,253 to Brax. Furthermore, it is also known from U.S. Pat. No. 4,525,257 (1985) to Kurtz et al that low level irradiation under 2 MR of narrow molecular weight distribution, linear low density ethylene/alphaolefin (LLDPE) particulate copolymer sufficient to introduce cross-links into the particulate copolymer but insufficient to provide for significant measurable gelation produces improved copolymer rheology providing increased extensional viscosity during film fabrication, i.e. the bubble is more stable as the LLDPE is more easily stretchable.

Therefore, it would seem that combining a chemical cross-linking agent with irradiative cross-linking, even if both were at low levels, would have a cumulative effect whereby the large interconnected polymer chains from the amount of cross-linking from both in the polymer would result in such high polymer viscosity as to cause difficulty during stretching so that an oriented tube could not be blown. However, it has been unexpectedly discovered that the combination of a chemical cross-linking agent with irradiation has resulted in the orientation process for manufacturing polymeric films having a decreased time, i.e. increased speed or rate.

SUMMARY OF THE INVENTION

It is therefore an object of the present invention to provide a heat-shrinkable film manufactured by a process including the combination of chemical cross-linking and irradiative cross-linking. In another aspect, the present invention provides for a method for the manufacture of a heat shrinkable polymeric film wherein the time for the orientation step in the manufacture of such films can be decreased, i.e. the orientation can be achieved at a greater speed than was heretofore possible.

Therefore, the present invention provides a multi-layer heat-shrinkable (oriented) film comprising at least one layer of cross-linkable polymer, said layer (1) originally containing a chemical cross-linking agent and (2) being irradiated, both being to an extent sufficient to provide an amount of cross-linking effective to accomplish an increased orientation rate.

By "extent sufficient to provide an amount of cross-linking effective to accomplish an increased orientation rate" as that phase is used herein, it is intended to mean that the amount of cross-linking from the presence of both the amount of chemical cross-linking agent originally contained in the feed for the at least one layer of cross-linkable polymer in combination with the dosage of irradiation, regardless of whether or not the amount of cross-linking from either or both can be measured by the gel test, will increase the orientation rate during processing of the film as compared with the orientation rate of the corresponding polymeric film that (I) is only irradiated, (II) only contains a chemical cross-linking agent, or (III) is both (a) free of a chemical cross-linking agent and (b) not irradiated. In the Examples below the increased orientation rate of the various films is indicated by a greater processing speed in feet/minute for the inflated "bubble" during the orientation step of processing.

The present invention also provides a process for manufacturing a heat-shrinkable (oriented) polymeric film comprising: (a) introducing a chemical cross-linking agent to a cross-linkable polymer by blending the cross-linking agent with the cross-linkable polymer, (b) extruding the blended cross-linked polymer, (c) subjecting the extruded polymer to irradiation, (d) orienting the extruded polymer in at least one direction, and (e) recovering an oriented polymeric film, wherein (f) both the original amount of cross-linking agent and the dosage of irradiation are to an extent sufficient to provide an amount of cross-linking effective to accomplish an increased orientation rate during the orientation step.

The present invention also provides a multilayer heat-shrinkable (oriented) film comprising at least one layer of cross-linkable polymer, said layer (1) originally containing from about 0.001 to about 0.025% by weight of an organic peroxide chemical cross-linking agent and (2) being subjected to irradiative cross-linking at a dosage from about 1 to about 20 MR.

DETAILED DESCRIPTION

Typically, in the manufacture of films, a suitable polymer usually in the form of pellets or the like, is brought into a heated area where the polymer feed is melted and heated to its extrusion temperature and extruded as a tubular "blown bubble" through an annular die. Other methods, such as "slot die" extrusion wherein the resultant extrudate is in planar form, as opposed to tubular form, are also well known. After extrusion, the film is then typically cooled and then stretched, i.e. oriented by "tenter framing" or by inflating with a "trapped bubble", to impart the heat-shrinkable property to the film, as is further described below. Irradiation, typically via an electron beam, preferably takes place prior to the stretching for orienting the film. Below, first is described in detail introducing the chemical cross-linking agent to the cross-linkable polymer followed by the general process for making and orienting film. Then irradiation is described in detail.

Any cross-linkable polymer may be employed in the present invention. Suitable cross-linkable polymers are the polyolefins, more preferably the polyethylenes, which are further described in the "Definitions" section below.

DEFINITIONS

The terms "cross-linking," "cross-linkable," "cross-linked", and the like, as used herein relate to, but are not limited to, a gelation test, namely ASTM D-2765-84 "Standard Test Methods for Determination of Gel Content and Swell Ratio of Cross-linked Ethylene Plastics," pages 557–565 (January, 1985). In the test, the polymer is dissolved in decahydronapthalene or xylene, and the insoluble fraction produced by cross-linking is determined by the amount that dissolves versus the amount that gels. In the present invention, it is irrelevant whether the amount present of irradiation alone would be so minimal as not to cause measurable gelation, or whether the amount present of chemical cross-linking agent alone would be so minimal as not to cause measurable gelation. There are other methods, such as infrared spectrophotometry, size exclusion chromotography, mass spectrophotometry, nuclear magnetic resonance, or shift in the polymer melt index, for measuring the effects of small amounts of irradiation or chemicals, said methods being well known to those skilled in the art, which methods could easily be employed for measuring the effect of a minimal amount of cross-linking or molecular weight increase whether by irradiation or by chemical agent. Accordingly, what is required is only that the combination of both a chemical cross-linking agent and irradiation be sufficient to cause an improved faster orientation, i.e. increased orientation rate.

In the practice of the invention, the chemical cross-linking agent is preferably introduced by blending it into the solid pellets of polymer feed for the at least one layer of cross-linkable polymer, such as by melt blending with heat and/or by the use of a solvent such as isopropyl alcohol, thereby forming a master batch (MB) of chemical cross-linking agent and polymer which may be stored. If melt blending is used, the temperature from the heat may or may not be high enough to carry out the reaction of the chemical cross-linking agent. It does not matter. Whether solvent blending was used or melt blending with low heat was used, typical extrusion temperatures are hot enough to carry out the cross-linking reaction. This master batch could be used as is for the polymer feed. Alternatively, it may be further mixed with pellets of the same or different polymer for the feed at an amount such that the resultant blend originally contains the desired concentration of chemical cross-linking agent.

Thus, statements that the at least one layer of cross-linkable polymer "originally" contains or contained a chemical cross-linking agent or statements about the "original" amount of cross-linking agent present are intended to be references to the amount measurable of chemical cross-linking agent added into the polymer feed for the polymer layer. Heating of the polymer or polymers in that layer, such as heating during blending, extrusion and/or orientation, often destroys some of the chemical cross-linking agent. Thus, the amount measurable of chemical cross-linking agent will typically be significantly less in the polymer layer of the final product as compared to the "original" amount blended into the polymer feed. Accordingly, the presence of chemical cross-linking agent will often be detectable in the final film product only in trace amounts, i.e. parts per billion.

Suitable chemical cross-linking agents for use in the present invention are the organic peroxides. Preferred organic peroxide compounds include, but are not limited to, dichlorobenzoyl peroxide, benzoyl peroxide, dicumyl peroxide, di-tert-butyl peroxide, 4,5-dimethyl-2,5-di(peroxy benzoate)hexyne-3, 1,3-bis(tert-butyl peroxy ispropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane and tertbutyl perbenzoate. A very advantageous organic peroxide for use in the invention is 2,5-dimethyl-2,5-bis(tert-butylperoxy)hexane, which for the sake of brevity is referred to herein as DBH. The 2,5-dimethyl-2,5-bis(-tert-butylperoxy)hexane is advantageous for use in films for packaging food products because the components into which it breaks down from heat are volatile and evaporate off leaving trace amounts, if any, of the DBH in the final film product. The effect of heat is further discussed in the paragraph below.

The chemical cross-linking agent must be originally present to an extent sufficient in the polymer so that the combination of both chemical cross-linking agent and irradiation will provide an effective amount of cross-linking to accomplish an increased orientation rate. To achieve this sufficient extent, the chemical cross-linking agent should be originally present in the composition of polymer feed for at least one film layer in an amount from about 0.001 to about 0.025% by weight, more preferably about 0.005 to about 0.020% by weight, even more preferably about 0.007 to about 0.015% by weight. Typically the heat from extrusion and orientation destroys some of the chemical cross-linking agent and thus these original weight amounts are not the amounts measurable in the final product. Rather, the weight amount of chemical cross-linking agent usually measurable in the final product is in parts per billion.

More particularly, the manufacture of shrink films may be generally accomplished by extrusion (single layer films) or coextrusion (multi-layer films) of thermoplastic resinous materials which have been heated to or above their flow or melting point from an extrusion or coextrusion die in, for example, either tubular or planar (sheet) form, followed by a post extrusion cooling. The stretching for orientation may be conducted at some point during the cool down while the film is still hot and at a temperature within its orientation temperature range, followed by completing the cooling. Alternatively, after the post extrusion cooling, the relatively thick "tape" extrudate is then reheated to a temperature within its orientation temperature range and stretched, to orient or align the crystallites and/or molecules of the material and then cooled down. The orientation temperature range for a given material or materials will vary with the different resinous polymers and/or blends thereof which comprise the material. However, the orientation temperature range for a given thermoplastic material may generally be stated to be below the crystalline melting point of the material but above the second order transition temperature (sometimes referred to as the glass transition point) thereof. Within this temperature range, the material may be effectively oriented.

The terms "orientation" or "oriented" are used herein to describe generally the process steps and resultant product characteristics obtained by stretching transversely, longitudinally, or both (whether during the post extrusion cool down or during reheating after the post extrusion cool down as described in the paragraph above) and substantially immediately cooling a resinous thermoplastic polymeric material which has been heated to a temperature within its orientation temperature range so as to revise the intermolecular configuration of the material by physical alignment of the crystallites and/or molecules of the material to improve certain mechanical properties of the film such as, for example, shrink tension and orientation release stress. Both of these properties may be measured in accordance with ASTM D 2838-81. When the stretching force is applied in one direction, monoaxial orientation results. When the stretching force is simultaneously applied in two directions, biaxial orientation results. The term oriented is also herein used interchangeably with the term "heat-shrinkable" with these terms designating a material which has been stretched and set by cooling while substantially retaining its stretched dimensions. An oriented (i.e. heat-shrinkable) material will tend to return to its original unstretched (unextended) dimensions when heated to an appropriate elevated temperature.

Returning to the basic process for manufacturing the film as discussed above, it can be seen that the film, once extruded (or coextruded if it is a multi-layer film), is then oriented by stretching within its orientation temperature range. The stretching to orient may be accomplished in many ways such as, for example, by "trapped bubble" techniques or "tenter framing". These processes are well known to those in the art and refer to orientation procedures whereby the material is stretched in the cross or transverse direction (TD) and/or in the longitudinal or machine direction (MD). After being stretched, the film is quickly cooled while substantially retaining its stretched dimensions and thus set or lock-in the oriented molecular configuration.

The film which has been made may then be stored in rolls and utilized to package a wide variety of items. If the material was manufactured by "trapped bubble" techniques the material may still be in tubular form or it may have been slit and opened up to form a sheet of film material. In this regard, a product to be packaged may first be enclosed in the material by heat sealing the film to itself where necessary and appropriate to form a pouch or bag and then inserting the product therein. Alternatively, a sheet of the material may be utilized to overwrap the product. These packaging methods are all well known to those of skill in the art.

When a material is of the heat-shrinkable type (i.e. oriented), then after wrapping, the enclosed product may be subjected to elevated temperatures, for example, by passing the enclosed product through a hot air tunnel. This causes the enclosing heat shrinkable film to shrink around the product to produce a tight wrapping that closely conforms to the contour of the product. As stated above, the film sheet or tube may be formed into bags or pouches and thereafter utilized to package a product. In this case, if the film has been formed as a tube it may be preferable first to slit the tubular film to form a film sheet and thereafter form the sheet into bags or pouches. Such bags or pouches forming methods, likewise, are well known to those of skill in the art.

The above general outline for manufacturing of films is not meant to be all inclusive since such processes are well known ot those in the art. For example, see U.S. Pat. Nos. 4,274,900; 4,229,241; 4,194,039; 4,188,443; 4,048,428, 3,821,182 and 3,022,543. The disclosures of these patents are generally representative of such processes and are hereby incorporated by reference.

Alternative methods of producing films of this type are known to those in the art. One well-known alternative is the method of forming a multi-layer film by an extrusion coating in combination with an extrusion or coextrusion process as was discussed above. In extrusion coating a first tubular layer or layers is extruded and thereafter an additional layer or layers is simultaneously or sequentially coated onto the outer surface of the first tubular layer or a successive layer. Exemplary of this method of U.S. Pat. No. 3,741,253. This patent is generally representative of an extrusion coating process and is hereby incorporated by reference.

Many other process variations for forming films are well known to those in the art. For example, conventional thermoforming or laminating techniques may be employed. For instance, multiple substrate layers may be first coextruded via a blown bubble tube with additional layers thereafter being extrusion coated or laminated thereon, or two multi-layer tubes may be coextruded with one of the tubes thereafter being extrusion coated or laminated onto the other.

In the preferred embodiment as illustrated in the examples below, the multi-layer film of the invention contains a barrier layer. The barrier layer may be composed of a layer comprising vinylidene chloride copolymer (saran), or composed of a layer comprising hydrolyzed ethylene-vinyl acetate copolymer (EVOH), preferably hydrolyzed to at least about 50%, most preferably to greater than about 99%, or composed of both a layer comprising vinylidene chloride copolymer and a layer comprising EVOH. When the barrier layer is composed of a layer comprising EVOH, the mole percent of vinyl acetate prior to hydrolysis should be at least about 29%, since for lesser amounts the effectiveness of the hydrolyzed copolymer as a barrier to fluids such as gas is substantially diminished. It is further preferred that that the barrier copolymer have a melt flow being generally compatible with that of the other components of the multi-layer film, preferably in the range of about 3–10 (melt flow being determined generally in accordance with ASTM D1238). The gas of main concern is oxygen and transmission is considered to be sufficiently low, i.e. the barrier material is relatively gas impermeable, when the transmission rate for the barrier material is below 70 cc/m$^2$/mil thickness/24 hours/atms, as measured according to the procedures of ASTM Method D-1434. The barrier layer of this multi-layer barrier shrink film embodiment of the present invention has a transmission rate below this value. EVOH can be advantageously utilized in the film of the invention since irradiative high energy electron treatment of the fully coextruded film does not degrade an EVOH barrier layer, as could be the case for a vinylidene chloride copolymer barrier layer.

When as further discussed below, a vinylidene chloride copolymer is employed instead of or together with EVOH as the barrier layer, then the irradiation preferably should take place prior to application of the saran layer to avoid degradation thereof. This application may be achieved by well known extrusion coating methods, as discussed above. More particularly, the extrusion coating method of film formation is preferable to coextruding the entire film when it is desired to subject one or more layers of the film to a treatment which may be harmful to one or more of the other layers. Exemplary of such a situation is a case where it is desired to irradiate with high energy electrons one or more layers of a film containing a barrier layer comprised of one or more copolymers of vinylidene chloride (i.e. saran), such as of vinylidene chloride and vinyl chloride or such as of vinylidene chloride and methyl acrylate. In other words, the barrier layer includes a saran layer in addition to or instead of an EVOH layer. Those of skill in the art generally recognize that irradiation with high energy electrons is generally harmful to such saran barrier layer compositions, as irradiation may degrade and discolor saran, making it turn brownish. Thus, if full coextrusion followed by high energy electron irradiation of the multi-layer structure is carried out on a film having a barrier layer containing a saran layer, the irradiation should be done at low levels with care. Alternatively, this situation may be avoided by using extrusion coating. Accordingly, by means of extrusion coating, one may first extrude or coextrude a first layer or layers, subject that layer or layers to high energy electron irradiation and thereafter extrusion coat the saran barrier layer and, for that matter, simultaneously or sequentially extrusion coat other later layers (which may or may not have been irradiated) onto the outer surface of the extruded previously irradiated tube. This sequence allows for the high energy electron irradiative treatment of the first and later layer or layers without subjecting the saran barrier layer to the harmful discoloration effects thereof.

Irradiative cross-linking may be accomplished by the use of high energy electrons, ultra violet rays, X-rays, gamma rays, beta particles, etc. Preferably, electrons are employed up to about 20 megarads (MR) dosage. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower. Many other apparatus for irradiating films are known to those of skill in the art. The irradiation is usually carried out at a dosage between about 1 MR and about 20 MR, with a preferred dosage range of about 2 MR to about 12 MR. Irradiation can be carried out conveniently at room temperature, although higher and lower temperatures, for example, 0° to 60° may be employed.

In the Examples below the multi-layer films were made by a conventional method of manufacturing, combining tubular coextrusion (colloquially called the hot blown bubble technique) with extrusion coating to achieve an oriented (heat-shrinkable) film. A tubular process was utilized wherein a coextruded tube of a two layer substrate core was extrusion coated with saran and another fourth layer simultaneously, then the four layer structure was cooled and collapsed, and then reheated and biaxially stretched in the transverse direction and in the longitudinal machine direction via inflating the tube with a bubble. Then the stretched bubble was cooled and collapsed, and the deflated film wound up as flattened, seamless, tubular film to be used later to make bags, overwrap, et cetera (with layer 4 as the package outside and layer 1 as the package inside). As illustrated in the Examples below, the deflate speed (also referred to in the art as the "racking speed") i.e. how fast the oriented bubble of film can be cooled and collapsed, was significantly improved, i.e. the orientation processing was increased, when the film both (1) contained a chemical cross-linking agent, and (2) had been irradiated.

In the Examples below that involve irradiation, prior to the coating of the saran layer and the additional layer, the two-layer substrate was guided through an ionizing radiation field; for example, through the beam of an electron accelerator to receive a radiation dosage in the range of about 4.5 megarads (MR).

DEFINITIONS

As used herein the term "extrusion" or the term "extruding" is intended to include extrusion, coextrusion, extrusion coating, or combinations thereof, whether by tubular methods, planar methods, or combinations thereof.

An "oriented" or "heat shrinkable" material is defined herein as a material which, when heated to an appropriate temperature above room temperature (for example 96° C.), will have a free shrink of about 5% or greater in at least one linear direction.

Unless specifically set forth and defined or otherwise limited, the terms "polymer" or "polymer resin" as used herein generally include, but are not limited to, homopolymers, copolymers, such as, for example block, graft, random and alternating copolymers, terpolymers, etc. and blends and modifications thereof. Furthermore, unless otherwise specifically limited the term "polymer" or "polymer resin" shall include all possible molecular configurations of the material. These structures include, but are not limited to, isotactic, syndiotactic and random molecular configurations.

The term "polyethylene" as used herein, which "polyethylene" is employed in the film of the invention, refers to families of resins obtained by substantially polymerizing the gas ethylene, $C_2H_4$. By varying the comonomers, catalysts and methods of polymerization, properties such as density, melt index, crystallinity, degree of branching, molecular weight and molecular weight distribution can be regulated over wide ranges. Further modifications are obtained by other processes, such as halogenation, and compounding additives. Low molecular weight polymers of ethylene are fluids used as lubricants; medium weight polymers are generally miscible with paraffin; and the high molecular weight polymers are resins generally used in the plastics industry. Polyethylenes having densities ranging from about 0.900 g/cc to about 0.935 g/cc are called low density polyethylenes (LPDE) while those having densities from about 0.935 g/cc to about 0.940 g/cc are called medium density polyethylenes (MDPE), and those having densities from about 0.941 g/cc to about 0.965 g/cc and over are called high density polyethylenes (HDPE). The older, classic low density types of polyethylenes are usually polymerized at high pressures and temperatures whereas the older, classic high density types are usually polymerized at relatively low temperatures and pressures.

The term "linear low density polyethylene" (LLDPE) as used herein, for a type of polyethylene which may be employed in the film of the invention, refers to the newer copolymers of a major amount of ethylene with a minor amount of one or more comonomers selected from $C_3$ to about $C_{10}$ or higher alpha olefins such as butene-1, 4-methyl-pentene-1, hexene-1, octene-1, etc. in which the molecules thereof comprise long chains with few side chains or branched structures achieved by low pressure polymerization. The side branching which is present will be short as compared to non-linear polyethylenes. The molecular chains of a linear polymer may be intertwined, but the forces tending to hold the molecules together are physical rather than chemical and thus may be weakened by energy applied in the form of heat. Linear low density polyethylene has a density preferably in the range from about 0.911 g/cc to about 0.935 g/cc, more preferably in the range of from about 0.912 g/cc to about 0.928 g/cc for film making purposes. The melt flow index of linear density polyethylene generally ranges from between about 0.1 to about 10 grams per ten minutes and preferably between from about 0.5 to about 3.0 grams per ten minutes. Linear low density polyethylene resins of this type are commercially available and are manufactured in low pressure vapor phase and liquid phase processes using transition metal catalysts. LLDPE is well known for its structural strength and anti-stresscracking properties. Also, LLDPE is known for its favored properties in the heat shrink process, and thus is well suited to make a heat shrinkable film as discussed above. Also, very low density linear low density polyethylene (VLDPE) may be employed, and such have a density from about 0.910 g/cc to about 0.860 g/cc, or even lower.

The term "ethylene vinyl acetate copolymer" (EVA) as used herein for a type of polyethylene refers to a copolymer formed from ethylene and vinyl acetate monomers wherein the ethylene derived units in the copolymer are present in major amounts and the vinyl acetate (VA) derived units in the copolymer are present in minor amounts. EVA is also known for having structural strength, as LLDPE does. For film forming purposes, it is desirable that the VA content of the EVA be from about 4% to about 25%, as when an EVA has a higher VA content the EVA behaves more like a glue or adhesive.

The term "ethylene alkyl acrylate copolymer" (EAA) as used herein for a type of polyethylene refers to a copolymer formed from ethylene and alkyl acrylate wherein the ethylene derived units in the copolymer are present in major amounts and the alkyl acrylate derived units in the copolymer are present in minor amounts. Thus, the term "ethylenemethyl acrylate copolymer" (EMA) as used herein for a type of polyethylene, refers to a copolymer formed from ethylene and methylacrylate monomers. The term "ethylene-ethylacrylate copolymer" (EEA) as used herein for a type of polyethylene, refers to a copolymer formed from ethylene and ethyl acrylate monomers. The term "ethylene-butyl acrylate copolymer" (EBA) as used herein for a type of polyethylene, refers to a copolymer formed from ethylene and butyl acrylate monomers. Many suitable EBA's are commercially available and these have a butyl acrylate content from about 3% to about 18% by weight.

Blends of all families of polyethylenes, such as blends of EVA, EMA, EEA, EBA, VLDPE, and LLDPE, may also be advantageously employed.

The following Examples are intended to illustrate the preferred embodiments of the invention and it is not intended to limit the invention thereby.

Materials employed in the examples:

USI is a commercial supplier of NPE No. 4895, which is an EBA having about 3% by weight butyl acrylate (the butyl groups are normal butyl, not tert butyl) and a melt index of 3.

The LLDPE employed in the examples was Dowlex ™ 2045.03 LLDPE having a melt index of 1.1 and a density of 0.920, supplied by Dow Chemical. The comonomer is octene.

The VLDPE employed in some of the examples was XPR 0545-33260 46L, supplied by Dow Chemical. It has a melt index of 3.3 and a density of 0.908, and the comonomer is octene.

The VLDPE employed in some of the examples was 1137, supplied by Union Carbide. It has a melt index of 0.8 and a density of 0.906, and the comonomer is butene.

In some of the examples as indicated, the LLDPE or VLDPE was blended in an amount of 93% polyethylene with 7% Bynel ™ CXA 3101, which is an EVA based acid modified adhesive having a VA content of 18.4%, supplied by du Pont.

The saran employed in the laboratory examples was Ixan ™ supplied by Solvay Corporation. It is a copolymer of vinylidene chloride with vinyl chloride.

Some of the EVA employed in the laboratory examples was LD318.92, which is an EVA containing 9% VA and having a melt index of 2.0. It is supplied by Exxon.

Some of the EVA employed in the examples was PE3508, which is an EVA having 12% VA and having a melt index of 0.35. It is supplied by du Pont.

The EVA employed in most of the laboratory examples was Elvax ™ 3135X, which is an EVA containing 12% VA and having a melt index of 0.34–0.35. It is supplied by du Pont. Also as indicated, one or more of the layeers comprising ELVAX 3135X type of EVA was prepared from a master batch (MB) of ELVAX 3135X with DBH blended therein. The resultant MB1 contained 0.2% by weight DBH, and the resultant MB2 contained 0.007% by weight DBH, and the resultant MB3 contained 1% by weight DBH. The DBH chemical cross-linking agent employed in the laboratory examples reciting MB1 or MB2 or MB3 was Lupersole 101 ™ supplied by Pennwalt Corporation. It is a commercially available 2,5-dimethyl-2,5-bis(tert-butyl peroxy)hexane.

For some of the examples, the master batch (MB) was made from Elvax 3135X and Polyvel CR5. Polyvel CR5 is a commercially available blend of 95% polyethylene and 5% DBH by weight, supplied by Polyvel Inc., 120 North White Horse Pike, Hammonton, N.J. 08037. The polyethylene has an extremely high melt index of 600 and is very waxy. The resultant MB4 contained 95% Elvax 3135X and 5% Polyvel CR5 by weight, and the resultant MB5 contained 90% Elvax 3135X and 10% Polyvel CR5 by weight.

For some of the examples, the particular master batch was further blended with more polymer (such as ELVAX 3135X, LD318.92 EVA, LLDPE, PE 3503 or VLDPE) for the feed and this further blended feed was extruded into the film.

stretching via a trapped bubble 4:1 in the transverse direction and 3:1 in the longitudinal direction for an overall biaxial orientation of 12:1. Where some of the samples have irradiation indicated, the two-layer substrate was irradiated at 4.5 MR prior to coating on the layer of saran and layer 4.

Percentages indicated in the examples were calculated as percent by weight.

Using the materials and process described in the paragraphs above, the following four-layer film structures were prepared and the far right-hand column indicates the orientation processing rate in feet/minute:

TABLE I

| SAMPLE NUMBER | COEXTRUDED SUBSTRATE LAYER 1 | LAYER 2 | EXTRUSION COATED LAYERS LAYER 3 | LAYER 4 | FEET/MIN (METERS/MIN) |
|---|---|---|---|---|---|
| 1 4.5 MR | ELVAX 3135X | BLEND OF 95% ELVAX 3135X 5% MB1 | SARAN | Blend of 95% ELVAX 3135X, 5% MB1 | 79.9(24.4) |
| 2 4.5 MR | ELVAX 3135X | Blend of 95% ELVAX 3135X 5% MB1 | SARAN | ELVAX 3135X | 122(37.2) |
| 3 4.5 MR | ELVAX 3135X | Blend of 95% ELVAX 3135X, 5% MB3 | SARAN | Blend of 95% ELVAX 3135X, 5% MB3 | Not tested |
| 4 4.5 MR | ELVAX 3135X | Blend of 95% ELVAX 3135X, 5% MB1 | SARAN | Blend of 50% ELVAX 3135X, 50% MB1 | Not tested |
| 5 4.5 MR | ELVAX 3135X | Blend of 87.5% ELVAX 3135X with 12.5% MB1 | SARAN | Blend of 87.5% ELVAX 3135X, 12.5% MB1 | Not tested |
| 6 4.5 MR | ELVAX 3135X | ELVAX 3135X | SARAN | ELVAX 3135X | 60(18.3) |
| 7A | MB2 | MB2 | SARAN | MB2 | 65(19.8) |
| 7B 4.5 MR | MB2 | MB2 | SARAN | MB2 | 80(24.4) |
| 8 4.5 MR | LD318.91 EVA | Blend of 90% LD318.92 EVA, 10% MB1 | SARAN | LD318.91 EVA | 80(24.4) |
| 9 4.5 MR | LD318.92 EVA | LD318.92 EVA | SARAN | LD318.92 EVA | 56(17.1) |
| 10 4.5 MR | LD318.92 EVA | Blend of 90% LLDPE 0.920, 10% MB1 | SARAN | LD318.92 EVA | 67(20.4) |
| 11 4.5 MR | LD318.92 EVA | Blend of 93% LLDPE 0.920, 7% BYNEL CXA | SARAN | LD318.92 EVA | 51(15.5) |
| 12 4.5 MR | LD318.92 EVA | Blend of 90% ELVAX 3135X, 10% MB1 | SARAN | LD318.92 EVA | 80(24.4) |
| 13 4.5 MR | LD318.92 EVA | ELVAX 3135X | SARAN | LD318.92 EVA | 80(24.4) |
| 14 4.5 MR | LD318.92 EVA | Blend of 90% PE3508 EVA, 10% MB1 | SARAN | LD318.92 EVA | 64(19.5) |
| 15 4.5 MR | LD318.92 EVA | Blend of 90% VLDPE 0.908, 10% MB1 | SARAN | LD318.92 EVA | 65.8(20.1) |
| 16 4.5 MR | LD318.92 EVA | Blend of 85% VLDPE 0.908, 15% MB1 | SARAN | LD318.92 EVA | 80(24.4) |
| 17 4.5 MR | LD318.92 EVA | Blend of 93% VLDPE 0.908, 7% BYNEL CXA | SARAN | LD318.92 EVA | 50(15.2) |

EXAMPLE I

Films were made by first hot blowing through an annular die a two-layer extruded tube of the structure: LAYER 1/LAYER 2 as the substrate. Then with a two-ply die, a layer of saran and an EVA layer were extrusion coated on. The resultant was then cooled and collapsed. The tube was then reheated and oriented by DISCUSSION OF SAMPLES 1-2: Both of these samples (1) contained DBH chemical cross linker and (2) had been irradiated at 4.5 MR. The rack employed for Sample 1 could only reach a maximum speed of 80 feet/minute, and it is believed Sample 1 could have been oriented even faster. Thus, the rack was modified to run faster, and as can be seen, Sample 2 oriented with a rate of 122 feet/minute.

DISCUSSION OF SAMPLES 3-5: All of these samples (1) contained DBH chemical cross linker and (2) had been irradiated at 4.5 MR. These were not tested for orientation rate as they did not extrude well. It is noted they contained high amounts of DBH, i.e. each of layers 2 and 4 in Sample 5 contained 0.025% by weight DBH, whereas layer 4 of Sample 4 contained 0.1% by weight DBH and each of layers 2 and 4 in Sample 3 contained 0.5% by weight DBH.

DISCUSSION OF SAMPLES 6-9: As can be seen from the above Table, for samples 7B and 8, which (1) contained DBH chemical cross-linking agent in EVA layer 2 and (2) had been irradiated at 4.5 MR, the orientation rate was much greater (80 feet/minute) than that for Sample 7A which had only the DBH in EVA layer 2 but no irradiation (65 feet/minute) and than that for samples 6 and 9 which had only been irradiated at 4.5 MR but had no DBH chemical cross-linking agent in EVA layer 2 (60 feet/minute and 56 feet/minute, respectively).

DISCUSSION OF SAMPLES 10-11: Likewise, as can be seen from the above Table, for sample 10, which (1) contained DBH in LLDPE layer 2 and (2) had been irradiated at 4.5 MR, the orientation rate was much greater (67 feet/minute) than that for sample 11 (51 feet/minute) which had only been irradiated at 4.5 MR but had no DBH in LLDPE layer 2.

DISCUSSION OF SAMPLES 12-13: As can be seen from the above Table, film Sample 12, which (1) contained DBH in EVA layer 2 and (2) had been irradiated at 4.5 MR, had the same (80 feet/minute) orientation rate as film Sample 13 which had only been irradiated at 4.5 MR but contained no DBH in EVA layer 2. Sample 12 should have had a greater orientation rate than Sample 13, not the same orientation rate, and this observation can be explained by the fact that the rack employed could only reach a maximum speed of 80 feet/minute. The rack was not modified to run faster, and thus the tests were not repeated.

DISCUSSION OF SAMPLE 14: Film Sample 14 was made with a new supply of EVA from du Pont, namely PE 3508. The orientation rate (64 feet/minute) of film Sample 12, which (1) contained DBH in EVA layer 2 and (2) had been irradiated at 4.5 MR, was not compared with a similar sample which had not been irradiated.

DISCUSSION OF SAMPLES 15-17: Likewise, as can be seen from the above Table, for samples 15 and 16, which (1) contained DBH in VLDPE layer 2 and (2) had been irradiated at 4.5 MR, the orientation rate (65.8 feet/minute and 80 feet/minute, respectively) was much greater than that for sample 17 (50 feet/minute) which had only been irradiated at 4.5 MR but contained no DBH in VLDPE layer 2.

Thus, an increased orientation rate as illustrated here can be achieved with a combination of both (1) chemical cross-linking agent and (2) irradiation.

EXAMPLE II

As in Example I films were made by first hot blowing through an annular die a two-layer extruded tube of the structure: LAYER 1/LAYER 2 as the substrate. Then with a two-ply die, a layer of saran and another layer were extrusion coated on. The resultant was then cooled and collapsed. The tube was then reheated and oriented by stretching via a trapped bubble 4:1 in the transverse direction and 3:1 in the longitudinal direction for an overall biaxial orientation of 12:1. Where irradiation has been indicated, the two-layer substrate was irradiated at 4 MR or 6 MR prior to the coating on of the layer of saran and the other layer.

As is indicated, one or more of the layers was prepared from a master batch (MB4 or MB5) of ELVAX 3135X with Polyvel CR5 blended therein.

The respective master batch was further blended with more polymer (such as EVA, LLDPE, or VLDPE) and this further blend was extruded into the film.

Percentages indicated were calculated as percent by weight.

Using the materials and process described in the paragraphs above, the following four-layer film structures were prepared:

TABLE II

| SAMPLE NUMBER | COEXTRUDED SUBSTRATE | | EXTRUSION COATED LAYERS | |
|---|---|---|---|---|
| | LAYER 1 | LAYER 2 | LAYER 3 | LAYER 4 |
| 1A 4 MR | LD318.91 EVA | Blend of 90% ELVAX 3135X, 10% MB4 | SARAN | LD318.91 EVA |
| 1B 6 MR | LD318.92 EVA | Blend of 90% ELVAX 3135X, 10% MB4 | SARAN | LD318.92 EVA |
| 2A 4 MR | LD318.92 EVA | Blend of 93% LLDPE 0.920, 7% MB5 | SARAN | LD318.92 EVA |
| 2B 6 MR | LD318.92 EVA | Blend of 93% LLDPE 0.920 7% MB5 | SARAN | LD318.92 EVA |
| 3A 4 MR | LD318.92 EVA | Blend of 93% VLDPE 0.906, 7% MB5 | SARAN | LD318.92 EVA |
| 3B 6 MR | LD318.92 EVA | Blend of 93% VLDPE 0.906, 7% MB5 | SARAN | LD318.92 EVA |
| 4A 4 MR | LD318.91 EVA | Blend of 93% VLDPE 0.908, 7% MB5 | SARAN | LD318.92 EVA |
| 4B 6 MR | LD318.91 EVA | Blend of 93% VLDPE 0.908, 7% MB5 | SARAN | LD318.92 EVA |

Orientation rate was not measured for any of the films in Table II and this experiment was discontinued, as the films extruded poorly and exhibited spotting with discrete colloidal particles. While it is not intended to be bound to any theory, it is believed these problems were encountered due to the highly waxy polyethylene (MI=600) present in the commercially available Polyvel CR5 that was employed in making the master batches for the samples in Table II.

EXAMPLE III

Films are made by first hot blowing through an annular die a two-layer extruded tube of the structure: LAYER 1/LAYER 2 as the substrate. Then with a two-ply die, a layer of saran and another layer are extrusion coated on. The resultant is then cooled and collapsed. The tube is then reheated and oriented by stretching via a trapped bubble 4:1 in the transverse direction and 3:1 in the longitudinal direction for an overall biaxial orientation of 12:1. Where irradiation is indicated in some of the samples, the two-layer substrate is irradiated to 4.5M prior to the coating on of the layer of saran and the other layer.

Also as is indicated, one or more of the layers is prepared from a master batch (MB) of EBA with DBH blended therein. The resultant MB6 contains 0.2% by weight DBH, and the resultant MB7 contains 0.007% by weight DBH.

The respective master batch is further blended with more polymer (such as EVA, LLDPE, EBA, or VLDPE) and this further blend is extruded into the film.

Using the materials and process described in the paragraphs above, the following four-layer film structures are prepared:

TABLE III (PERCENTAGES ARE BY WEIGHT)

| SAMPLE NUMBER | COEXTRUDED SUBSTRATE | | EXTRUSION COATED LAYERS | |
|---|---|---|---|---|
| | LAYER 1 | LAYER 2 | LAYER 3 | LAYER 4 |
| 1 4.5 MR | ELVAX 3135X | BLEND OF 95% EBA, 5% MB1 | SARAN | ELVAX 3135X |
| 2 4.5 MR | ELVAX 3135X | BLEND OF 95% EBA, 5% MB1 | SARAN | BLEND OF 95% ELVAX 3135X, 5% MB1 |
| 3 4.5 MR | ELVAX 3135X | BLEND OF 87.5% EBA, 12.5% MB1 | SARAN | BLEND OF 95% VLDPE, 5% EBA |
| 4 4.5 MR | ELVAX 3135X | BLEND OF 90% LLDPE 0.920, 5% EBA, 5% MB1 | SARAN | ELVAX 3135X |
| 5 4.5 MR | MB2 | BLEND OF 90% VLDPE 0.908, 5% EBA, 5% MB2 | SARAN | MB2 |
| 6 4.5 MR | LD318.91 EVA | BLEND OF 90% VLDPE 0.906, 5% EBA, 5% MB1 | SARAN | LD318.91 EVA |
| 7 4.5 MR | LD318.92 EVA | BLEND OF 90% EVA, 5% EBA, 5% MB1 | SARAN | BLEND OF 95% LLDPE 0.920, 5% EBA |
| 8 4.5 MR | LD318.91 EVA | BLEND OF 90% LLDPE 0.920, 5% EBA, 5% MB1 | SARAN | BLEND OF 95% LLDPE 0.920, 5% EBA |
| 9 4.5 MR | LD318.91 EVA | BLEND OF 93% LLDPE 0.920, 4% EBA, 3% MB1 | SARAN | BLEND OF 95% LLDPE 0.920, 5% EBA |
| 10 4.5 MR | ELVAX 3135X | BLEND OF 95% EBA, 5% MB6 | SARAN | ELVAX 3135X |
| 11 4.5 MR | ELVAX 3135X | BLEND OF 95% EBA, 5% MB6 | SARAN | BLEND OF 95% ELVAX 3135X, 5% MB6 |
| 12 4.5 MR | ELVAX 3135X | BLEND OF 87.5% EBA, 12.5% MB6 | SARAN | BLEND OF 95% VLDPE 0.908, 5% EBA |
| 13 4.5 MR | ELVAX 3135X | BLEND OF 90% LLDPE 0.920, 5% EBA, 5% MB6 | SARAN | ELVAX 3135X |
| 14 4.5 MR | MB2 | BLEND OF 90% VLDPE 0.906, , 5% EBA, 5% MB7 | SARAN | MB2 |
| 15 4.5 MR | LD318.91 EVA | BLEND OF 90% VLDPE 0.906, 5% EBA, 5% MB6 | SARAN | LD318.91 EVA |
| 16 4.5 MR | LD318.92 EVA | BLEND OF 90% EVA, 5% EBA, 5% MB6 | SARAN | BLEND OF 95% LLDPE 0.920, 5% EBA |
| 17 4.5 MR | LD318.92 EVA | BLEND OF 90% LLDPE 0.920, 5% EBA, 5% MB6 | SARAN | BLEND OF 95% LLDPE 0.920, 5% EBA, |
| 18 4.5 MR | LD318.92 EVA | BLEND OF 93% LLDPE 0.920 4% EBA, 3% MB6 | SARAN | LD318.92 EVA |
| 19 4.5 MR | EBA | Blend of 97% EBA, 3% MB6 | Saran | EBA |

While the present invention has been disclosed in connection with the preferred embodiment thereof, it should be understood that there may be other embodiments which fall within the spirit and scope of the invention as defined by the following claims.

What is claimed is:

1. A process for manufacturing a heat-shrinkable oriented polymeric film comprising:

(a) introducing a chemical cross-linking agent to a cross-linkable polymer by blending the chemical cross-linking agent with the cross-linkable polymer, (b) extruding a film of the blended cross-linkable polymer, said chemical cross-linking agent is originally present in an amount from about 0.001 to about 0.025% by weight, (c) subjecting the extruded polymer film to electron beam irradiation, (d) heating and stretching to orient the irradiated extruded polymer film in at least one direction, followed by cooling the film while it is in its stretched condition and (e) recovering an oriented, heat-shrinkable polymeric film, wherein (f) both the original amount of chemical cross-linking agent and the dosage of electron beam irradiation are to an extent sufficient to provide an amount of cross-linking effective to accomplish an increased orientation rate.

2. The process of claim 1 wherein said chemical cross-linking agent is an organic peroxide.

3. The process of claim 2 wherein said organic peroxide is dichlorobenzoyl peroxide, benzoyl peroxide, dicumyl peroxide, di-tert-butyl peroxide, 4,5-dimethyl-2,5-di(peroxy benzoate)hexyne-3, 1,3-bis(tert-butyl peroxy isopropyl)benzene, lauroyl peroxide, tert-butyl peracetate, 2,5-dimethyl-2,5-di(tert-butyl-peroxy)hexyne-3, 2,5-dimethyl-2,5-di(tert-butylperoxy)hexane or tertbutyl perbenzoate.

4. The process of claim 1 wherein the irradiation is in a dosage from about 1 MR to about 20 MR.

5. The process of claim 1 wherein the cross-linkable polymer is a polyolefin.

6. The process of claim 5 wherein the polyolefin is a polyethylene.

7. The process of claim 6 wherein the polyethylene is HDPE, MDPE, LDPE, LLDPE, VLDPE, EVA, EAA, EMA, EBA, EEA, or mixtures thereof.

8. The process of claim 1 wherein the extruding includes extruding a barrier layer.

* * * * *